United States Patent [19]

Arene et al.

[11] Patent Number: 4,780,272

[45] Date of Patent: Oct. 25, 1988

[54] DEVICE FOR SUSPENDING A STRUCTURE

[75] Inventors: Gilbert Arene, Pertuis; Luigi Pierazzi, Aix en Provence; Charley Renaux, Jouques, all of France

[73] Assignee: Commissariat A L'Energie Atomique, Paris, France

[21] Appl. No.: 912,159

[22] Filed: Sep. 24, 1986

Related U.S. Application Data

[63] Continuation of Ser. No. 613,881, May 24, 1984, abandoned.

[30] Foreign Application Priority Data

May 26, 1983 [FR] France .................. 83 08735

[51] Int. Cl.$^4$ .................................................. G21C 13/00
[52] U.S. Cl. ...................................... 376/361; 376/404; 376/460; 376/463
[58] Field of Search .............. 376/403, 404, 460, 171, 376/361, 461, 287, 347; 52/633, 637

[56] References Cited

U.S. PATENT DOCUMENTS 4,249,352  2/1981  Marchaj .
4,309,252  1/1982  Gilroy ........................ 376/460 X

FOREIGN PATENT DOCUMENTS 1200391 12/1959  France .
2289031  5/1976  France .
2437047  4/1980  France .
2486295  1/1982  France .
2448313  2/1982  France .

Primary Examiner—John F. Terapane
Assistant Examiner—John S. Maples
Attorney, Agent, or Firm—Pearne, Gordon, McCoy & Granger

[57] ABSTRACT

A device for suspending a core cover from a sealing slab of a fast neutron nuclear reactor of the type comprising a vertically axed vessel structure filled with liquid metal, closed by the slab and containing the reactor core. The device comprises an upper row and a lower row of superimposed, generally flat, planar, metal plates enabling the rows to be joined to the slab and to the core cover, each row of plates defining a closed convex envelope. The plates are flexible in a direction radial relative to the envelope, while being rigid in a direction circumferential with respect to the envelope. The two rows of flexible plates are interconnected by a lattice of rigid bars in an "X" or "V" form. The upper row plates have upper edges rigidly fixed in position relative to the slab and lower edges rigidly fixed in position relative to the lattice. The lower row plates have upper edges rigidly fixed in position relative to the lattice and lower edges rigidly fixed in position relative to the core cover.

8 Claims, 4 Drawing Sheets

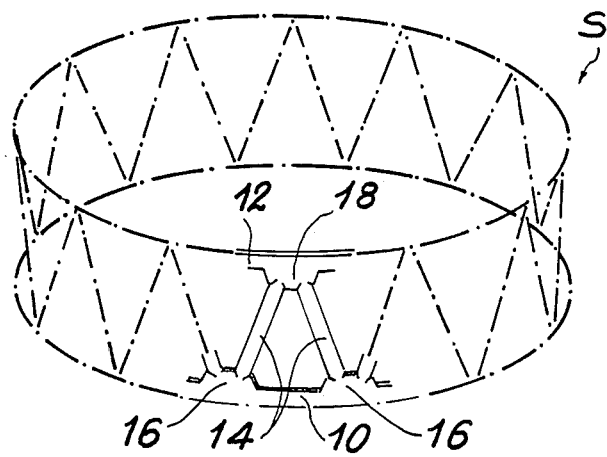
FIG.1
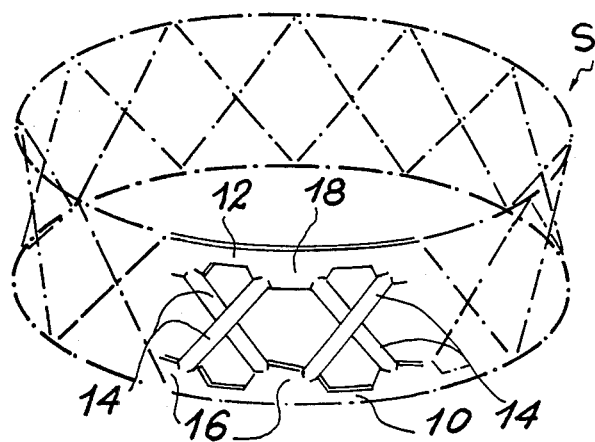

DEVICE FOR SUSPENDING A STRUCTURE

This is a continuation of application Ser. No. 613,881, filed on May 24, 1984, now abandoned.

BACKGROUND OF THE INVENTION

The present invention relates to a device for connecting a suspended structure to an attachment structure.

For example, this device can be applied to the suspension above the core of a fast neutron nuclear reactor of a structure for supporting means making it possible to ensure the monitoring and inspection of the reactor core, as well as the deflection towards the exchangers of the sodium jet from the core. The complete assembly of the structure and the means supported by it will be called the reactor core cover.

In the present state of the art, this core cover is attached to a plug included in the small rotary plug by means of a perforated ferrule. The complete assembly formed by said plug, the ferrule and the core cover is called the plug - cover - core.

The use of a suspension ferrule suffers from the following disadvantages. In order to be able to withstand any earthquake, it has to be given a significant thickness, so that it has a high thermal inertia prejudicial to its adaptation to sudden temperature changes of the sodium leaving the core and resulting from variations in the reactor operating conditions. Moreover, the high mass of this ferrule cannot be directly supported by the small rotary plug, so that it is necessary to subdivide it, which increases costs.

SUMMARY OF THE INVENTION

In the particular case of the application of the invention to a fast neutron reactor, it specifically relates to realizing the suspension of the core cover by means of a suspension device not suffering from the disadvantages of the presently used ferrule and in particular having a good transverse rigidity and a good radial flexibility enabling it to deform to compensate differential expansions between the core cover and the sealing slab of the main vessel.

In the same way as the existing ferrule, this device can be attached to the plug included in the small rotary plug, although as a result of its lightness this arrangement is no longer necessary. Instead it can be directly attached to the small rotary plug or any other upper reactor sealing device.

However, it should be noted that, although the invention is particularly suitable for the suspension of the core cover in a fast neutron reactor, it is not limited to this application and in general terms relates to a device for connecting a suspended structure to an attachment structure in all cases where it is desirable for the suspended structure to have both a good transverse rigidity and a certain radial flexibility.

The present invention therefore specifically proposes a device for connecting a suspended structure to an attachment structure, wherein it comprises two rows of superimposed metal plates enabling them to be respectively joined to the suspended structure and to the attachment structure, each row of plates defining a sealed convex envelope and being constituted by flexible plates in a direction radial relative to said envelope, the two rows of flexible plates being connected by at least one lattice of rigid bars comprising bars inclined in two different directions in the circumferential sense defined by the said envelopes.

Preferably, the suspension device according to the invention also comprises a base ring joined to the suspended structure and carrying one of the rows of flexible plates, and a support ring joined to the attachment structure and carrying the other row of flexible plates. The flexible plates can then either be fixed to the rings, e.g. by welding or fitting in, or can be cut into the actual mass of the rings.

According to a special embodiment of the invention, the suspension device comprises at least two lattices connected by at least one intermediate ring carrying two other rows of plates, each defining a closed convex envelope and constituted by flexible plates in a direction radial with respect to the said envelope.

According to a special embodiment of the invention, the envelopes defined by each row of plates are circular, coaxial and usually substantially of the same diameter.

According to two embodiments of the invention, the rigid bars constituting the lattice or lattices connecting the flexible plates can either be arranged in juxtaposed V form, or in juxtaposed X form.

For example, the invention is applicable to a fast neutron nuclear reactor comprising a vertically axed vessel containing the reactor core and filled with liquid metal, said vessel being closed by a sealing slab on which is suspended a core cover having means for inspecting and monitoring the core, as well as the deflection of the sodium jet leaving the core, wherein the core cover is suspended on the slab by means of a connecting device of the previously defined type.

BRIEF DESCRIPTION OF THE DRAWINGS

The invention is described in greater detail hereinafter relative to non-limitative embodiments and with reference to the attached drawings, wherein show:

FIGS. 1a and 1b perspective views diagrammatically showing two embodiments of the suspension device according to the invention.

DETAILED DESCRIPTION OF THE PREFERRED EMBODIMENTS

Figure 2:
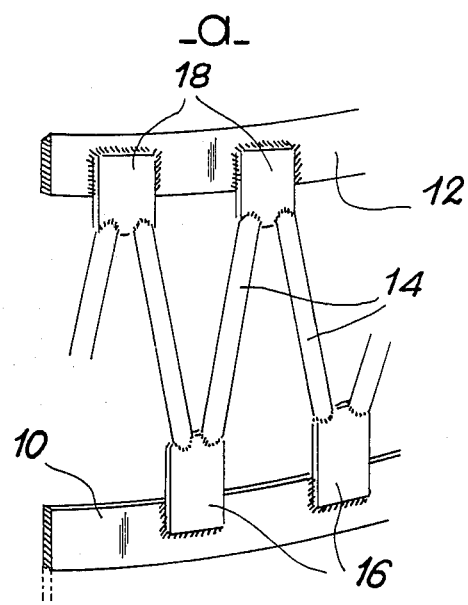
FIGS. 2a and 2b fragmentary larger scale perspective views illustrating, in the case of the embodiment of FIG. 1a, the two possible constructional variants for the suspension device according to the invention, which are also applicable to the embodiment of FIG. 1b.
Figure 2:
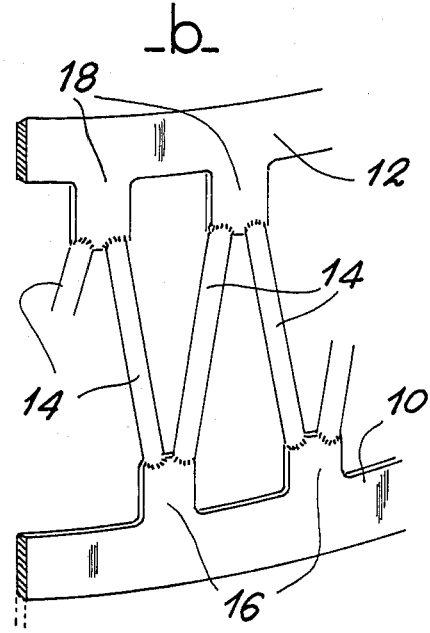

As illustrated in FIGS. 1a and 1b, the suspension device S according to the invention comprises a base ring 10, which is to be directly joined to the structure to be suspended, a support ring 12 for direct connection to the attachment structure and at least one lattice of rigid bars 14 connected to rings 10 and 12, by flexible plates 16 and 18 respectively.

Rings 10 and 12 are cirular metal rings which are coaxially superimposed, and preferably have substantially the same diameter. However, as will be shown hereinafter in the application described with reference to FIGS. 3 and 4, this diameter can differ when the shape of the suspended structure and the stresses to which it is exposed make this necessary.

It is pointed out that rings 10 and 12 are not indispensable to the construction of the invention. Thus, the two rows of plates 16 and 18 can be directly fixed, on the one hand to the suspended structure and on the other hand to the attachment structure.

In general terms, rings 10 and 12 or, when they are not present, the envelopes of plates 16, 18 can have a closed, convex shape differing from a circle, particularly when the upper face of the suspended structure is flat. For example, the shape can be polygonal, oval, etc.

Bars 14 are rigid, linear metal bars and in particular made from sections having a good resistance to buckling and having a cross, H, round or tubular cross-section.

The rigid bars 14 of the suspension device according to the invention are arranged so as to give said device a good circumferential and therefore transverse rigidity or stiffness. To this end, bars 14 are regularly distributed between the rings and slope half in one direction and half in the other in the circumferential direction defined by rings 10 and 12. More specifically, the embodiment of FIG. 1a, the rigid bars 14 are arranged in juxtaposed V form between rings 10 and 12, whereas in the embodiment according to FIG. 1b, they are arranged in juxtaposed X form between the rings.

The flexible plates 16, 18 by which the bar 14 are respectively attached to rings 10, 12 are constructed, according to the invention, so as to have a certain flexibility in the radial direction with respect to the rings, whilst still giving a good circumferential rigidity to the device.

To this end and as illustrated in FIGS. 2a and 2b, different constructional variants of the invention can be envisaged. Although FIGS. 2a and 2b illustrate these constructional variants, in the case where the rigid bars 14 are arranged in V form according to the embodiment of FIG. 1a, it is readily apparent that these variants can also apply to the embodiment of FIG. 1b.

FIG. 2a shows the case where the flexible plates 16, 18 are separate from rings 10, 12 respectively. In this case, plates 16, 18 can be fixed to the rings corresponding thereto, e.g. by welding or fitting in.

FIG. 2b shows the case where the flexible plates 16, 18 are cut into the mass of the metal sheet constituting rings 10 and 12 respectively.

In both cases, it can be seen from FIGS. 2a and 2b that the fixing of the rigid bars 14 to flexible plates 16, 18 can be carried out by any appropriate means and in particular by welding.

Figure 3:
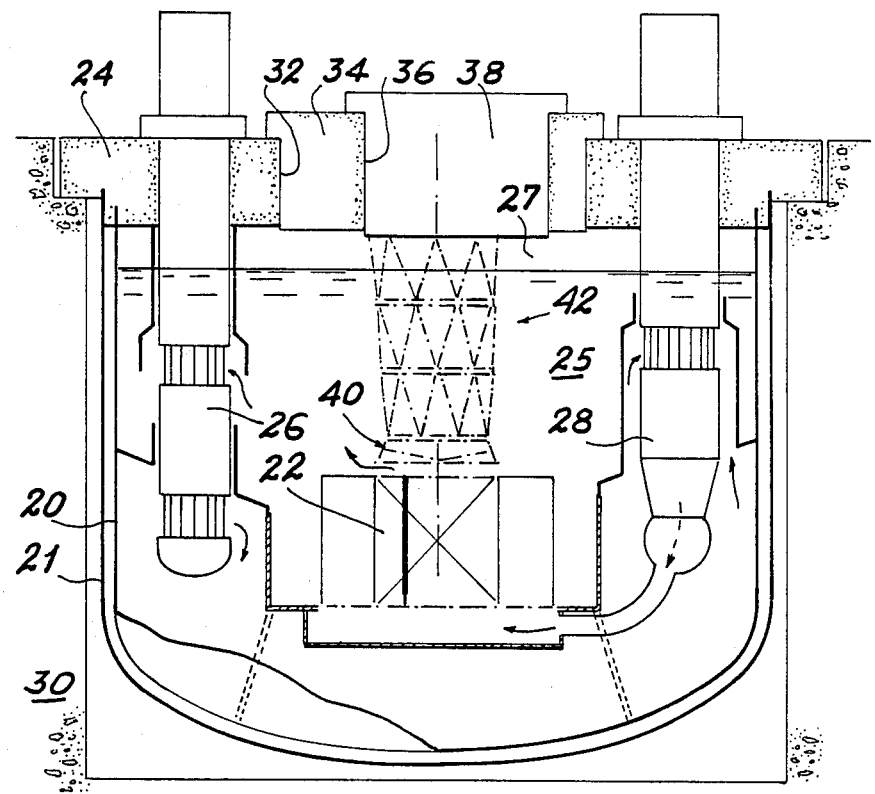
FIG. 3 a diagrammatic cross-sectional view of a fast neutron nuclear reactor, whose core cover is suspended on the sealing slab by means of the suspension device according to the invention.
Figure 4:
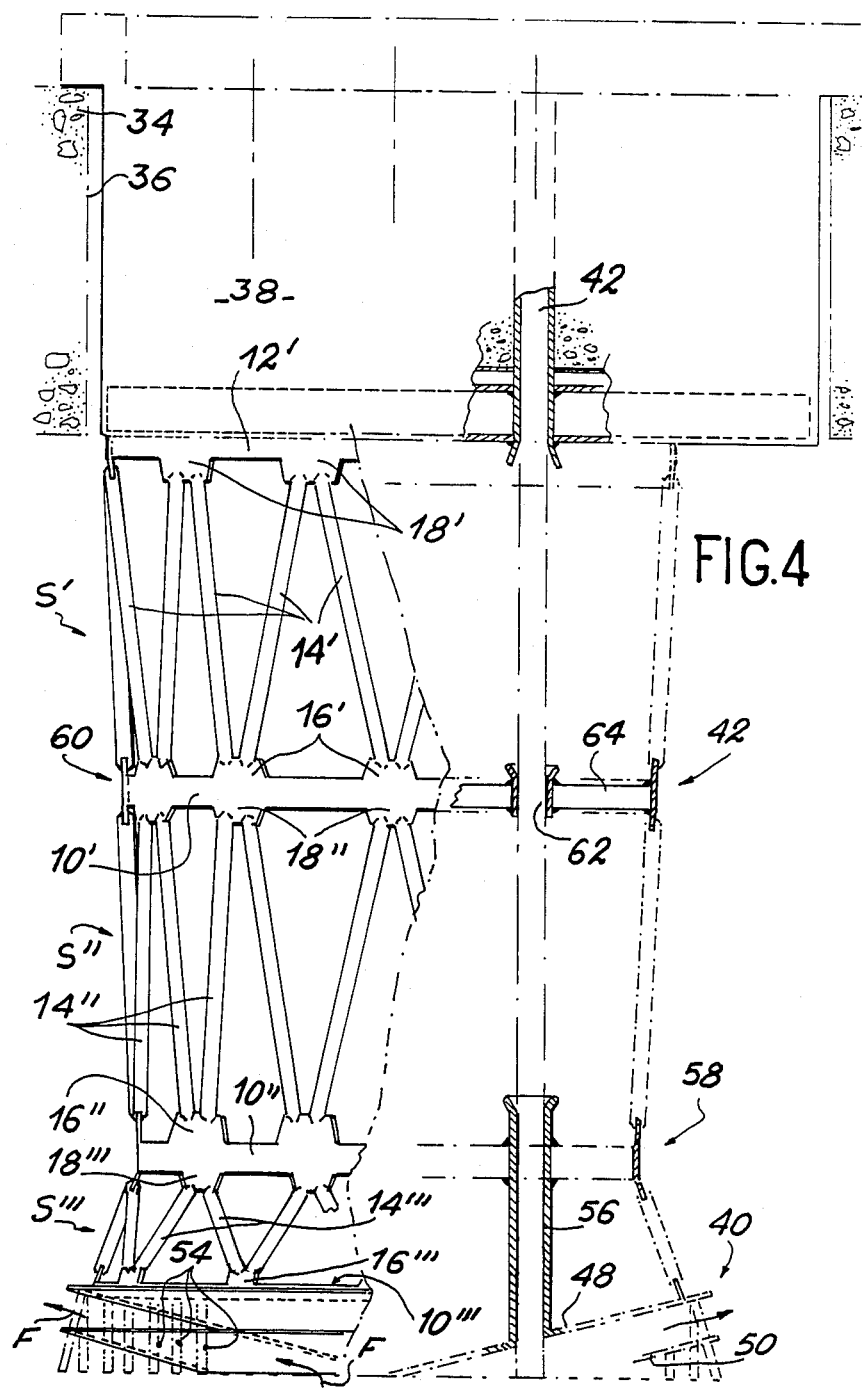
FIG. 4 a larger scale sectional view showing the core cover suspension device in the reactor of FIG. 3.

As illustrated in FIGS. 3 and 4, the suspension structure, whereof several variants have been described, is particularly suitable for the suspension of the core cover of a fast neutron nuclear reactor.

Thus, FIG. 3 shows a vertically axed vessel 20 of an integrated fast neutron reactor. It is pointed out that in this type of reactor, the reactor core 22, as well as the complete primary circuit, are arranged within the vessel 20, which is sealed at its upper end by a sealing slab 24. More specifically, vessel 20 is filled with a liquid metal 25, such as sodium ensuring the transfer of the heat given off by core 22 to the heat exchangers 26, under the action of circulating pumps 28. The liquid sodium 25 is surmounted by a neutral gas atmosphere 27, such as argon.

The main vessel 20 is surrounded by a second vessel 21, called the safety vessel and these two vessels are generally suspended from the sealing slab 24, which rests on a concrete protective enclosure 30.

Slab 24 is centrally provided with an opening 32 sealed by a large rotary plug 34, which has itself an opening 36 off-centered relative to opening 32. In turn, opening 36 is sealed by a small rotary plug 38. This known structure makes it possible, as a result of the combined rotations of plugs 34 and 38, to have access to all points of the reactor core 22 with the aid of one or more not shown handling pokers.

In its area surrounding opening 32, slab 24 also has passages by means of which components such as exchangers 26 and pumps 28 are suspended.

In addition, the nuclear reactor according to the invention has, directly above core 22, a core cover 40 suspended on the small rotary plug 38 by a suspension device 42 according to the invention and which will now be described in greater detail at the same time as core cover 40 and with reference to FIG. 4.

In order to permit the passage through the slab of the inspection assemblies, the electrical conductors from equipment such as thermocouples and the sodium sampling tubes for detecting and locating fractures in the sheaths or jackets, the small rotary plug 38 provided with the necessary passages. Only one of the passages provided for the inspection assemblies is shown at 42 in FIG. 4.

In its construction diagrammatically shown in FIG. 4, the core cover 40 comprises a conical deflecting plate 48, whose periphery is duplicated by a lower truncated cone-shaped plate 50 parallel to plate 48 and contributing therewith, in the manner indicated by arrows F in FIG. 4, to ensuring the flow of hot sodium from the reactor core to exchangers 26 (FIG. 3).

Plates 48 and 50 support a plurality of generally vertical sampling tubes 54 arranged facing each of the fuel assemblies forming the reactor core 22. Each of these sampling tubes 54 is connected with the aid of a not shown tube to a device for locating sheath or jacket fractures through a not shown passage provided for this purpose in FIG. 3. Each of the sampling tubes 54 also makes it possible to house a not shown thermocouple, which directly measures the temperature of the hot sodium leaving the reactor core. The thermocouples are connected to external measuring devices by not shown electrical conductors, which pass through the rotary plug 38 by another not shown passage.

In order to be able to ensure the guidance of the aforementioned inspection assemblies, the core cover 40 also has vertically axed sleeves 56 arranged in the extension of each of the passages 42 passing through the small rotary plug 38. These sleeves 56, which pass with a certain clearance through the deflecting plate 48, are supported by a grid 58 constituted by intersecting vertical metal plates positioned above the deflecting plates.

If appropriate and as shown in FIG. 4, a second grid 60 is arranged substantially at mid-height between the lower face of the small rotary plug 38 and grid 58. Grid 60 can also support guidance sleeves such as 62 arranged in the extension of sleeves 56 and passages 42.

In the configuration described hereinbefore, apart from the suspension of deflecting plates 48 and 50, it is necessary to ensure the suspension of grids 58 and 60.

According to the invention, the suspension of these three structures on the small rotary plug 38 is simultaneously brought about with the aid of the suspension device 42, which for this purpose comprises three devices S', S" and S'" realized in the manner described hereinbefore with reference to FIGS. 1a, 1b, 2a and 2b.

More specifically, FIG. 4 shows that the grid 60 is suspended on the lower metal plate of the small rotary plug 38 by a device S' which, according to the invention, has flexible plates 18' made in one piece with ring 12', welded to the lower metal plate of the small rotary plug, flexible plate 16' made in one piece with a ring 10' supporting sleeve 62 by means of grid 60 and a lattice of rigid bars 14', whose ends are respectively fixed to plates 15' and 18'.

The supporting device S" is used for suspending grid 58 from grid 60. This device also comprises a flexible plate 18" made in one piece with ring 10' of grid 60, flexible plate 16" made in one piece with another ring 10" used for supporting, by means of spaced plates, the sleeves 56 of grid 58 and a lattice of rigid bars 14" connecting the flexible plates 16" and 18".

As shown in FIG. 4, the diameter of suspension device 42 regularly decreases and in a relatively limited manner from the small rotary plug 38 to grid 58, in such a way that the envelope of the two devices S' and S" constitutes a truncated cone, whose apex angle is very small. Conversely, device S'" by which deflecting plate 48 is suspended on grid 58 has a diameter which increases in a relatively rapid manner. This configuration makes it possible to take account of the truncated cone shape of deflecting plate 48.

Obviously, all the constructional variants of the invention described with reference to FIGS. 1a, 1b, 2a, 2b can be applied to devices S', S", S'" constituting the suspension device 42 by which the core cover 40 is suspended on the small rotary plug 38. Moreover, as a function of the distance separating the deflecting plate 48 from the reactor slab, the number of lattices of superimposed rigid bars constituting device 42 can either be reduced or increased.

As a result of the use of device 42 according to the invention, deflecting plate 48 and grids 58, 60 suspended on the small rotary plug can expand in different ways with respect thereto without leading to significant mechanical stresses. Thus, the lattices of rigid bars 14 widen to a greater or a lesser extent by deformation of flexible plates 16, 18, in order to compensate the differential expansions.

Conversely, when the core cover 40 is subject to a horizontal stress relative to the slab on which it is suspended, e.g. in the case of an earthquake, the structure of the lattices formed by bars 14, as well as the good rigidity of plates 16, 18 in the circumferential direction enable the supporting device according to the invention to adequately withstand said transverse stress.

What is claimed is:

1. A fast neutron nuclear reactor of the type comprising a vertically axed vessel structure filled with liquid metal, closed by a slab and containing the reactor core, wherein a core cover is suspended from said slab via a suspension device, said suspension device comprising an upper row and a lower row of superimposed, generally flat, planar, metal plates enabling said rows to be respectively joined to the slab and to the core cover, each row of plates defining a closed convex envelope, said plates being flexible in a direction radial relative to said envelope, while being rigid in a direction circumferential with respect to said envelope, the two rows of flexible plates being interconnected by at least one lattice of rigid bars comprising bars inclined in two different directions in the circumferential sense defined by the said envelopes, the said upper row plates having upper edges rigidly fixed in position relative to said slab and lower edges rigidly fixed in position relative to said lattice, said lower row plates having upper edges rigidly fixed in position relative to said lattice and lower edges rigidly fixed in position relative to said core cover and wherein said device comprises at least two lattices connected by at least one intermediate ring carrying two other rows of flexible plates, each of said row of plates defining a closed convex envelope, the plates of said other rows of plates being flexible in a direction radial with respect to the envelope.

2. A device according to claim 1, wherein the bars constituting each lattice are arranged in V form.

3. A device according to claim 1, wherein the bars constituting each lattice are arranged in X form.

4. A device according to claim 1, wherein said device also comprises a base ring integral with the core cover and carrying one of the rows of flexible plates and a support ring integral with the attachment structure and carrying the other row of flexible plates.

5. A device according to claim 4, wherein the flexible plates are fixed to the rings.

6. A device according to claim 4, wherein the flexible plates are cut into the mass of the rings.

7. A device according to claim 1, wherein the envelopes defined by each row of plates are circular and coaxial.

8. A device according to claim 7, wherein the envelopes defined by each row of plates are substantially of the same diameter.

* * * * *